(12) United States Patent
Kato et al.

(10) Patent No.: US 9,579,707 B2
(45) Date of Patent: Feb. 28, 2017

(54) WORK PROCESSING APPARATUS AND DIE MOVING METHOD FOR WORK PROCESSING APPARATUS

(71) Applicant: AMADA COMPANY, LIMITED, Kanagawa (JP)

(72) Inventors: Tetsuaki Kato, Kanagawa (JP); Atsushi Yamagishi, Kanagawa (JP); Daiya Uchida, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 7 days.

(21) Appl. No.: 14/424,687

(22) PCT Filed: Aug. 7, 2013

(86) PCT No.: PCT/JP2013/071347
§ 371 (c)(1),
(2) Date: Feb. 27, 2015

(87) PCT Pub. No.: WO2014/038337
PCT Pub. Date: Mar. 13, 2014

(65) Prior Publication Data
US 2015/0209852 A1    Jul. 30, 2015

(30) Foreign Application Priority Data

Sep. 4, 2012  (JP) ................................. 2012-193972

(51) Int. Cl.
*B21D 37/04*  (2006.01)
*B21D 37/14*  (2006.01)
(Continued)

(52) U.S. Cl.
CPC ........... *B21D 37/04* (2013.01); *B21D 5/0281* (2013.01); *B21D 37/14* (2013.01); *B25J 11/00* (2013.01); *Y10S 901/02* (2013.01)

(58) Field of Classification Search
CPC ........ B21D 5/002; B21D 5/02; B21D 5/0254; B21D 5/0281; B21D 37/04; B21D 37/06;
(Continued)

(56) References Cited

U.S. PATENT DOCUMENTS 3,431,759 A * 3/1969 Whittingham ........... B21D 7/06
72/369
4,641,413 A * 2/1987 Hallqvist ........... B23Q 3/15513
414/736

(Continued)

FOREIGN PATENT DOCUMENTS

EP   2138247    12/2009
JP   6-234018    8/1994
(Continued)

OTHER PUBLICATIONS

Search report from Japan, mail date is Nov. 12, 2013.
Search Report issued by E.P.O. patent office in E.P.O. Patent Application No. 13835771.0, dated Sep. 30, 2015.

*Primary Examiner* — Edward Tolan
(74) *Attorney, Agent, or Firm* — Greenblum & Bernstein, P.L.C.

(57) ABSTRACT

A work processing apparatus upwardly turns a wrist of a vertical articulated robot to retract a hand that is holding a work to a position where the hand and work do not interfere with a press brake. In this state, an engaging projection arranged at a front end of an upper arm or at the wrist is inserted into an engaging hole of a lower die of the press brake and the vertical articulated robot is operated to move the lower die along a groove of a die holder.

4 Claims, 3 Drawing Sheets

(51) Int. Cl.
*B25J 11/00* (2006.01)
*B21D 5/02* (2006.01)

(58) Field of Classification Search
CPC ...... B21D 37/14; B21D 37/147; B23Q 3/155; B23Q 3/15513; B23Q 7/046; Y10S 901/08; B25J 11/00; B25J 15/0052; B25J 15/0066
See application file for complete search history.

(56) References Cited

U.S. PATENT DOCUMENTS

| | | | | |
|---|---|---|---|---|
| 4,736,512 | A * | 4/1988 | Gusching | B23Q 7/046 483/14 |
| 4,753,100 | A * | 6/1988 | Hanni | B21D 5/0281 700/165 |
| 4,991,422 | A * | 2/1991 | Sartorio | B21D 11/20 72/306 |
| 5,727,415 | A * | 3/1998 | Alitalo | B21D 5/02 483/28 |
| 6,694,794 | B2 * | 2/2004 | Crippa | B21D 7/024 72/149 |
| 6,854,311 | B2 * | 2/2005 | Schmauder | B21D 7/12 72/149 |
| 7,891,225 | B2 * | 2/2011 | Hammerer | B21D 7/12 72/299 |
| 8,601,848 | B2 * | 12/2013 | Yogo | B21D 7/024 72/14.8 |
| 8,770,247 | B2 * | 7/2014 | Oda | B25J 9/0084 156/351 |
| 2009/0025199 | A1 * | 1/2009 | Hariki | B25J 9/1682 29/430 |
| 2013/0327104 | A1 | 12/2013 | Haselboeck | |

FOREIGN PATENT DOCUMENTS

| | | |
|---|---|---|
| JP | 9-108738 | 4/1997 |
| JP | 9-155452 | 6/1997 |
| JP | 10-34241 | 2/1998 |
| JP | 2000-254728 | 9/2000 |
| WO | 2012/103565 | 8/2012 |

* cited by examiner

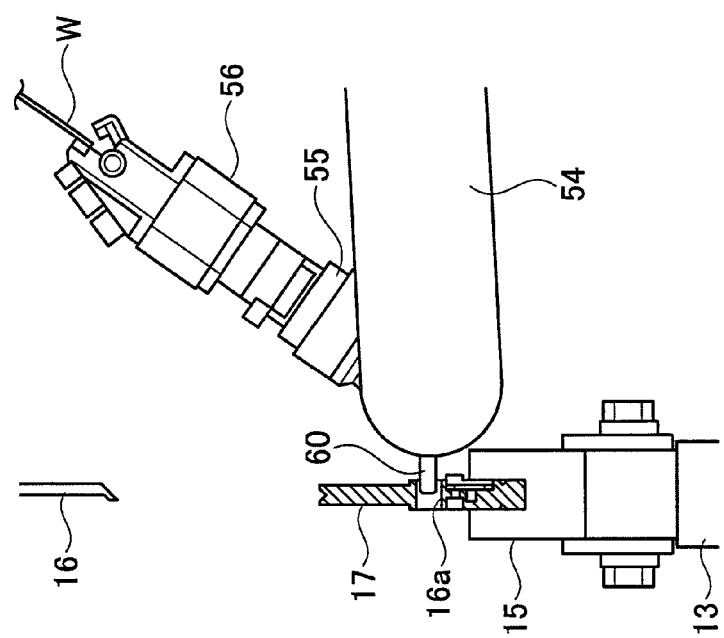
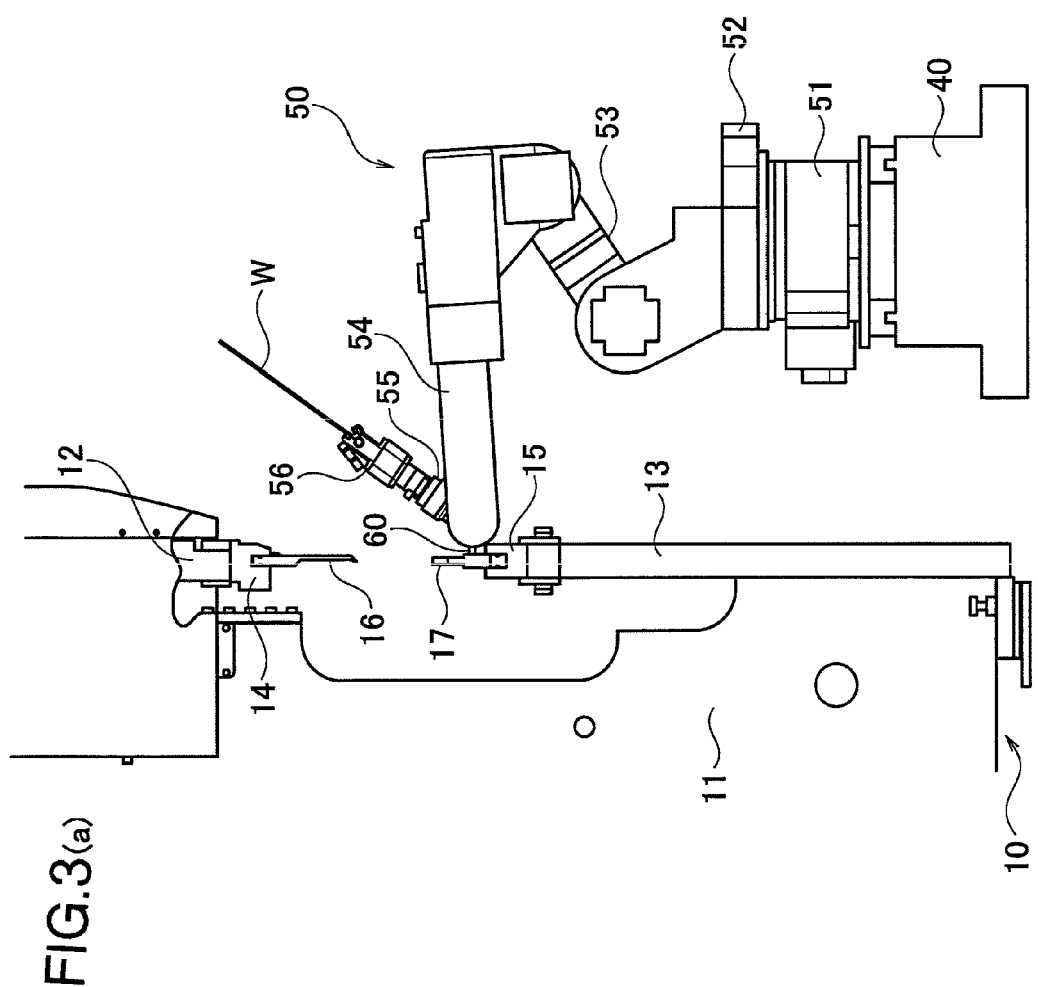

WORK PROCESSING APPARATUS AND DIE MOVING METHOD FOR WORK PROCESSING APPARATUS

TECHNICAL FIELD

The present invention relates to a work processing apparatus that is a combination of a processing machine such as a press brake and a carrier robot for moving a work and to a die moving method for the work processing apparatus.

BACKGROUND ART

A widely-known work processing apparatus is a combination of a processing machine such as a press brake for achieving a predetermined process on a work with a die attached to a die holder and a carrier robot for carrying the work. The work processing apparatus of this type uses a hand (gripper) of the carrier robot to move the die as disclosed in, for example, Japanese Unexamined Patent Application Publication No. 2000-254728.

SUMMARY OF INVENTION

Problems to be Solved by Invention

When moving the die attached to the processing machine by the carrier robot, the related art temporarily places the work held by the hand onto a temporary space to release the hand, and then, holds and moves the die with the hand. In this way, the related art must temporarily place the work when moving the die during the processing of the work, thereby increasing a takt time.

In consideration of this situation, the present invention provides a work processing apparatus capable of moving a die with a carrier robot while the robot is holding a work with its hand, as well as a die moving method for the work processing apparatus.

Means to Solve Problems

To solve the problems mentioned above, a technical aspect of the present invention provides a work processing apparatus including a processing machine that carries out a predetermined process on a work with a die attached to a die holder and a carrier robot that is arranged in the vicinity of the processing machine and is provided with a hand at a front end of a movable mechanism, to hold an item such as the work, the movable mechanism including a robot arm and wrist and being operated to control the position and attitude of the hand. The work processing apparatus is characterized in that the movable mechanism is operated to retract the hand that is holding the work to a not-interfering position with respect to the processing machine, an engaging part arranged on the movable mechanism and facing the die is engaged with the die, and the carrier robot is operated to move the die.

Another technical aspect of the present invention provides a die moving method for a work processing apparatus. The work processing apparatus includes a processing machine that carries out a predetermined process on a work with a die attached to a die holder and a carrier robot that is arranged in the vicinity of the processing machine and is provided with a hand at a front end of a movable mechanism, to hold an item such as the work, the movable mechanism including a robot arm and wrist and being operated to control the position and attitude of the hand. The die moving method is characterized by operating the movable mechanism to retract the hand that is holding the work to a not-interfering position with respect to the processing machine, engaging an engaging part, which is arranged on the movable mechanism and faces the die, with the die, and operating the carrier robot to move the die.

BRIEF DESCRIPTION OF DRAWINGS

FIG. 3(a) is a side view illustrating the work processing apparatus in which the carrier robot moves the lower die of the press brake and FIG. 3(b) is an enlarged view illustrating an essential part of FIG. 3(a).

MODE OF IMPLEMENTING INVENTION

An embodiment of the present invention will be explained with reference to the drawings.

Figure 1A:
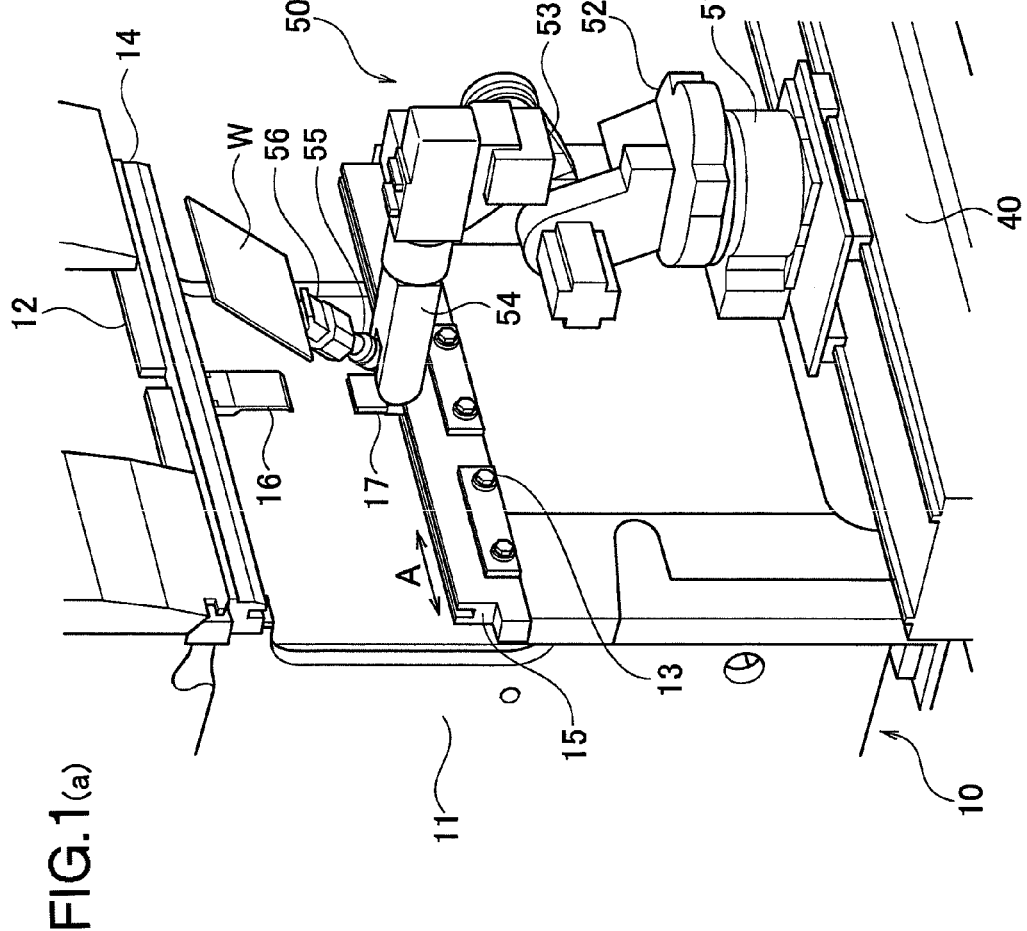
FIG. 1(a) is a perspective view illustrating a work processing apparatus according to an embodiment of the present invention in which a carrier robot moves a lower die of a press brake and FIG. 1(b) is an enlarged perspective view illustrating an essential part of FIG. 1(a).
Figure 1B:
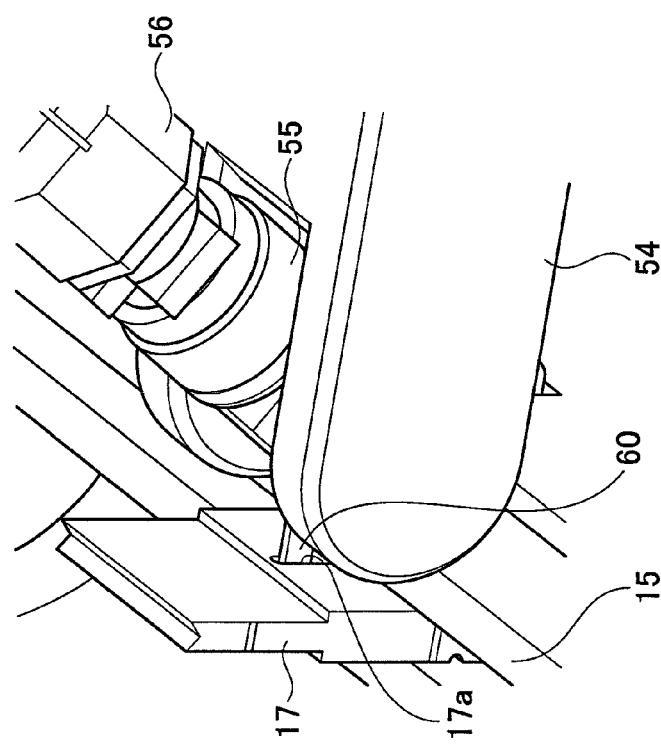
Figure 2B:
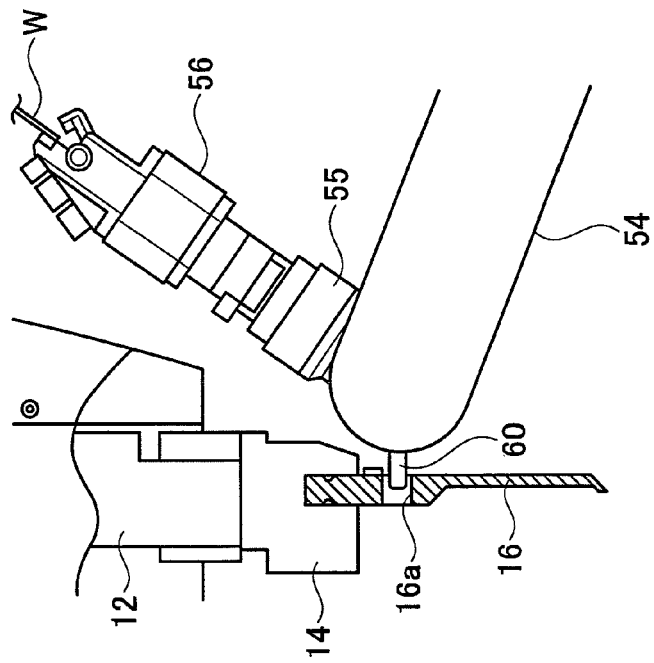
FIG. 2(a) is a side view illustrating the work processing apparatus in which the carrier robot moves an upper die of the press brake and FIG. 2(b) is an enlarged view illustrating an essential part of FIG. 2(a).
Figure 2A:
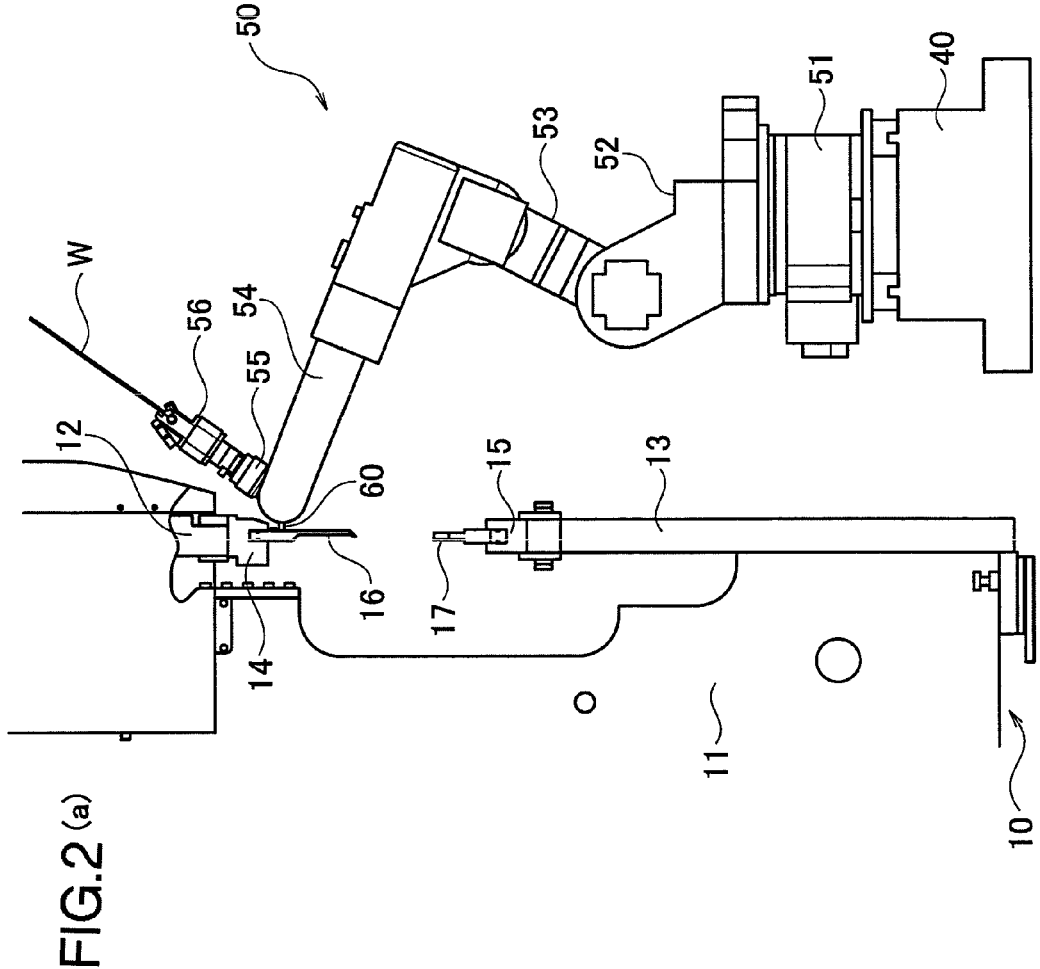

FIG. 1(a) is a perspective view illustrating a work processing apparatus according to an embodiment of the present invention in which a carrier robot moves a lower die of a press brake, FIG. 1(b) is an enlarged perspective view illustrating an essential part of FIG. 1(a), FIG. 2(a) is a side view illustrating a state that the carrier robot moves an upper die of the press brake, FIG. 2(b) is an enlarged view illustrating an essential part of FIG. 2(a), FIG. 3(a) is a side view illustrating a state that the carrier robot moves the lower die of the press brake, and FIG. 3(b) is an enlarged view illustrating an essential part of FIG. 3(a).

The work processing apparatus according to the present embodiment includes a processing machine, i.e., a press brake 10 and a vertical articulated robot (carrier robot) 50 that is arranged in the front vicinity of the press brake 10.

The press brake 10 has an upper table 12 that is arranged at an upper part of a frame 11 and is slidable in an up-down direction and a lower table 13 that is stationarily arranged at a lower part of the frame 11. The upper table 12 has a die holder 14 to which an upper die (a punch) 16 is detachably attached. The lower table 13 has a die holder 15 to which a lower die (a die) 17 is detachably attached. The upper die 16 and lower die 17 cooperate to carry out a predetermined bending process on a plate work W. The die holders 14 and 15 incorporate die clamps (not illustrated) to support and fix the upper and lower dies 16 and 17.

The upper and lower dies 16 and 17 are provided with engaging holes (engaging parts) 16a and 17a, respectively, into which an engaging projection (engaging part) 60 arranged on the vertical articulated robot 50, which will be explained later.

The vertical articulated robot 50 has a six-axis degree of freedom to supply the plate work W to the press brake 10 and transfer a bent work (product) to a product storing area. The vertical articulated robot 50 is movable in a left-right direction along a guide rail 40 that extends in the left-right direction in front of the press brake 10.

The vertical articulated robot 50 has a base 51 that is supported with the guide rail 40 and is movable in the left-right direction. On the base 51, a swivel 52 is supported with a first axis (S-axis) that turns in a horizontal plane. The swivel 52 supports a lower arm 53 with a second axis (L-axis) that swings in a front-rear direction. A front end of the lower arm 53 supports an upper arm 54 with a third axis (U-axis) that swings in the up-down direction.

The upper arm 54 is rotatably supported with a fourth axis (R-axis) that turns around a longitudinal axial line of the upper arm 54. At a front end of the upper arm 54, a wrist 55 is supported with a fifth axis (B-axis) that turns in a direction orthogonal to the longitudinal axial line of the upper arm 54. At a front end of the wrist 55, a hand 56 is supported with a sixth axis (T-axis) that turns the wrist 55 around a longitudinal axial line of the wrist 55. The hand 56 has a gripper to grip the plate work W. Instead of the gripper, a vacuum cup or an electromagnet may be employed.

A movable part including the robot arm (the lower arm 53 and upper arm 54) and the wrist 55 except the hand 56 is referred to as a movable mechanism. The vertical articulated robot 50 moves the movable mechanism to control the position and attitude of the hand 56. When the wrist 55 is turned upward as illustrated in the drawings, the hand that is holding the work W is retracted to a not-interfering position with respect to the press brake 10.

In this state, a base part of the wrist 55 or a front end of the upper arm 54 is able to be positioned to face the upper die 16 or lower die 17 and is provided with an engaging projection 60 that is inserted into and engaged with the engaging hole 16*a* of the upper die 16 or the engaging hole 17*a* of the lower die 17. With the engaging projection 60 inserted in the engaging hole 16*a* (17*a*) of the die 16 (17), the vertical articulated robot 50 may be driven to move the upper die 16 or the lower die 17 as indicated with an arrow A along a groove of the die holder 14 or 15.

A method of moving the upper die 16 or lower die 17 will be explained.

During the processing of the work W, a need may arise to move the upper die 16 or lower die 17 along the groove of the die holder 14 or 15 as indicated with the arrow A. In this case, the wrist 55 is upwardly turned with the hand 56 holding the work W, so that the work W may not interfere with any part of the press brake 10. In this condition, the engaging projection 60 of the robot is positioned to the upper die 16 or lower die 17 to be moved and the engaging projection 60 is inserted into the engaging hole 16*a* or 17*a* of the upper die 16 or lower die 17. Then, the vertical articulated robot 50 is operated to move the upper die 16 or lower die 17 along the groove of the die holder 14 or 15 as indicated with the arrow A.

In this way, a need for moving the upper die 16 and/or lower die 17 may arise while the work W is being processed with the upper die 16 and lower die 17 of the press brake 10. Then, the hand 56 that is holding the work W is retracted to a not-interfering position and the engaging projection 60 arranged on the upper arm 54 or wrist 55 of the vertical articulated robot 50 is inserted into the engaging hole 16*a* or 17*a* of the upper die 16 or lower die 17. Thereafter, the vertical articulated robot 50 is driven to move the upper die 16 or lower die 17 to a target location. This needs no troublesome steps of temporarily moving the held work to a temporary space during the processing of the work, holding the upper die 16 or lower die 17 with the hand 56, and moving the upper or lower die to the target location. As a result, a takt time is reduced.

Only inserting the engaging projection 60 arranged on the upper arm 54 or wrist 55 of the vertical articulated robot 50 into the engaging hole 16*a* or 17*a* of the upper die 16 or lower die 17 accomplishes an engagement necessary for moving the upper die 16 or lower die 17. This work is simple and surely executable.

According to the present invention, the carrier robot holds a work with its hand, and in this state, the engaging part provided for the movable mechanism of the carrier robot is engaged with a die of the processing machine and the carrier robot is operated to move the die. This configuration eliminates a need for temporarily placing the work held with the hand to a temporary space, thereby shortening a takt time of the work to process.

Only inserting the engaging projection, i.e., the engaging part arranged on the movable mechanism of the carrier robot into an engaging hole formed in a die realizes the engagement needed for moving the die.

The hand of the carrier robot that is holding a work is retracted to a not-interfering position with respect to the processing machine. In this state, the engaging part arranged on the movable mechanism of the carrier robot is engaged with a die of the processing machine and the carrier robot is operated to move the die. This configuration eliminates a need for temporarily placing the work held with the hand to a temporary space, thereby reducing a takt time of the work to process.

If a need for moving the upper or lower die of the press brake arises while a work is being processed with the dies, the hand that is holding the work is retracted to a not-interfering position. In this state, the engaging projection arranged on the robot arm or wrist of the carrier robot is inserted into the engaging hole of the die and the carrier robot is operated to move the die to a target location. Without the troublesome steps of temporarily placing the held work to a temporary space, holding the die with the hand, and moving the die to the target location during the processing of the work, the present invention is able to reduce a takt time.

(United States Designation)

In connection with United States designation, this international patent application claims the benefit of priority under 35 U.S.C. 119(a) to Japanese Patent Application No. 2012-193972 filed on Sep. 4, 2012 whose disclosed contents are cited herein.

The invention claimed is:

1. A work processing apparatus, comprising:
a processing machine carrying out a predetermined process on a work with a die attached to a die holder; and
a carrier robot arranged in the vicinity of the processing machine and provided with a hand at a front end of a movable mechanism for holding the work, the movable mechanism including a robot arm and wrist, and being operated to control the position and attitude of the hand, wherein
as the movable mechanism is operated to retract the hand that is holding the work to a not-interfering position with respect to the processing machine, an engaging part, which is distinct from both the robot arm and the hand, arranged on the movable mechanism and facing the die is engaged with the die, wherein the carrier robot is operated to move the die, and
wherein the engaging part is configured to engage the die while the hand grips the workpiece.

2. The work processing apparatus according to claim 1, wherein the engaging part is an engaging projection to be inserted into an engaging hole formed in the die.

3. A die moving method for a work processing apparatus that includes:

a processing machine carrying out a predetermined process on a work with a die attached to a die holder; and a carrier robot arranged in the vicinity of the processing machine and provided with a hand at a front end of a movable mechanism for holding the work, the movable mechanism including a robot arm and wrist and being operated to control the position and attitude of the hand, the die moving method further comprising:

operating the movable mechanism to retract the hand that is holding the work to a not-interfering position with respect to the processing machine; and in this state engaging an engaging part, which is arranged on the movable mechanism and faces the die, with the die and operating the carrier robot to move the die, the engagement part being provided so as to be distinct from both the robot arm and the hand, and wherein the engaging part is configured to engage the die while the hand grips the workpiece.

4. The die moving method for a work processing apparatus according to claim 3, wherein the processing machine is a press brake that includes an upper table to hold an upper die through a die holder and a lower table to hold a lower die through a die holder, one of the upper and lower tables being slid in an up-down direction to carry out a bending process on the work; and the method inserts an engaging projection arranged as the engaging part on the robot arm or wrist into an engaging hole formed in the upper or lower die, and in this state, operates the carrier robot to move the upper or lower die along the die holder.

* * * * *